Patented Nov. 4, 1941

2,261,626

UNITED STATES PATENT OFFICE 2,261,626

AZO DYES

Joseph W. Lang, Woodstown, N. J., assignor to E. I. du Pont de Nemours & Company, Wilmington, Del., a corporation of Delaware No Drawing. Application October 24, 1939, Serial No. 300,944

1 Claim. (Cl. 260—193)

A. This invention is a process for making azo insoluble colors of improved qualities. It relates particularly to the use of assistants, during the coupling or finishing operations, the presence of which is conducive to the production of an improved pigment.

B. The objects of the invention are to improve the brilliance, the tinctorial power, and the working properties of azo pigments which are free from water solubilizing groups such as sulfonic and carboxylic acids.

C. The objects of the invention are accomplished, generally speaking by forming the azo pigments in the presence of cationic surface-acting agents. More particularly, the objects are accomplished by preparing the pigments in the presence of quaternary ammonium, sulfonium, or phosphonium compounds.

D. The formation of the pigment as referred to in this invention can be considered to consist of two parts: first, the precipitation of the pigment by coupling; and second, the change from one physical form to a more desirable form on heating before isolation. This second part may not be necessary with certain pigment dyes and may be harmful to others, but when used is considered a part of the formation of the color.

E. The best conditions for the preparation of the pigment dyestuffs may well be determined when using these assistants. For instance, the combination meta-nitro-para-toluidine→beta-naphthol, when made in acetic acid medium in the presence of stearyl trimethyl ammonium bromide in the amount of 10 lbs. per mol, caused darker and brighter masstones, weaker and duller undertones, and bluer and weaker tints compared to a "control" made similarly except for omission of the assistant, but when the same coupling was carried on as an alkaline coupling in the presence of stearyl trimethyl ammonium bromide a darker masstone, a yellower and brighter undertone, and a yellower tint resulted. Thus, a considerable variation in result may be obtained by varying the conditions under which the reaction takes place.

F. The following examples illustrate but do not limit the invention:

Example I 152 parts of meta-nitro-para-toluidine are diazotized in the usual way with 82 parts of 100% hydrochloric acid and 69 parts of sodium nitrite at 0° C. The clear diazo compound is then coupled at 25° C. with acetoacet-anilide prepared as follows: 177 parts of acetoacet-anilide are slurried with 2000 parts of water and 220 parts of sodium acetate. To this slurry are added before the coupling 20 parts of stearyl trimethyl ammonium bromide. After coupling the yellow color slurry is stirred for a short time and filtered. The press cake is washed acid free and either dried or kept as paste according to the use to which it is to be put. The yellow monazo pigment paste, which was made in this manner, is greener, brighter, and much stronger when tested for tinting wall paper than the same product made in the same manner except for omission of the stearyl trimethyl ammonium bromide.

This product, when dried and tested in printing ink, also exhibits this increased strength compared with the control using no assistant.

Example II

The tetrazonium compound prepared in solution from 253 parts of 3,3'-dichlorbenzidine in the usual manner was coupled at 25° C. with 354 parts of acetoacet-anilide slurried in 2000 parts of water in which is dissolved 612 parts of sodium acetate and to which is added 8 parts of cetyl-pyridinium bromide before coupling. After coupling, the yellow color slurry is heated to 90° C. and filtered. After the prass cake is washed acid-free, the paste is dried. When tested in printing ink, a much lighter and brighter masstone, greener and cleaner tint and a greater tinting strength were obtained from this pigment made according to this example and compared with the same product made in the same way except for omission of cetyl-pyridinium bromide.

Example III

The product made according to the process outlined in Example II except for the use of 40 parts of cetyl-pyridinium bromide instead of 8 parts was found to be lighter and brighter in masstone, greener and cleaner in tints than the product obtained by Example II, and very much superior in these respects to the product made with the omission of the cetyl pyridinium bromide.

Example IV 440 parts of para-chlor-acetoacet-anilide were dissolved in 5000 parts of water at 50° C. with 88 parts of sodium hydroxide (100%). There were added 544 parts of sodium acetate crystals and 10 parts of stearyl trimethyl ammonium bromide and the solution was cooled to 25° C. and made acid to litmus with 88 parts of hydrochloric acid (10%). There was then added to this a clarified solution of the tetrazonium chloride obtained in the usual way from 244 parts of dianisidine. The pigment was filtered at 90°, washed and dried. The printing ink prepared by grinding this pigment in lithographic varnish had a lighter and brighter masstone and a cleaner undertone than another sample of this same pigment made without the stearyl trimethyl ammonium bromide. It also gave a much brighter tint when diluted with white ink. When dispersed in rubber, this pigment gave a redder and brighter and stronger color than the control.

Example V 10 parts of octa-decyl-phenyl-methyl-sulfonium-methyl-sulfate were substituted for the cetyl pyridinium bromide used in Example II. Essentially the same results were obtained.

Example VI 10 parts of dodecyl-dimethyl-sulfonium-methyl-sulfate were substituted for the cetyl pyridinium bromide used in Example II. Essentially the same results were obtained.

Example VII 10 parts of dodecyl-dimethyl-sulfonium-iodide were substituted for the cetyl pyridinium bromide used in Example II. Essentially the same results were obtained.

G. Another advantage observed when using the cationic surface-acting compounds, particularly the ammonium compounds, in the formation of the combination 3,3'-dichlorbenzidine→(aceto-acet-anilide)$_2$ is that the isolated pigment is much more stable to drying than a comparable coupling made without the use of these assistants. That is, of the two products dried at low temperature (25° C.), an impractical temperature, the one using no assistant will be stronger, but if the temperature is raised to 50° C., a practical temperature, the original strong pigment will lose considerable strength on drying and will then be redder and weaker than the product made with the assistant, which yields the same results at either temperature.

H. It was found that other quaternary compounds such as C-cetyl-betaine, lauryl-trimethyl-ammonium-bromide, N-cetyl-betaine and stearyl-trimethyl-ammonium-bromide, when substituted for the compounds specifically named above, produced similar results. The alkyl ammonium compounds include salts, such as bromides, and inner salts, such as betaines. In the former the long alkyl chain is a part of a positively charged ion, and in the latter it is part of a neutral molecule in which the long alkyl chain contains both an acid and a basic group.

I. In the presence of these quaternary compounds the acetoacet-anilide, or other coupling components, dissolved more rapidly during the coupling, so that the time required to complete the coupling reaction was reduced by about 20%.

J. The improvement in the quality of pigments, caused by the presence of the agents during the coupling, is also caused in a lesser degree if the agents are added after the coupling and before the heating instead of before the coupling.

K. The reason for the effects produced by precipitating an azo pigment dye in the presence of a relatively small amount of a quaternary ammonium compound is not known. However, it is recognized that the tinctorial properties of a pigment are a function of the crystalline form or size of the particles which make up the pigment. It is probable that cationic surface-acting agents such as quaternary ammonium compounds are adsorbed on the colloidal aggregates of the precipitated azo pigment dyes and either arrest further growth of the particles or aggregates or influence by their presence the form of the incipient crystals. Another possibility is that the cationic surface-active agents are adsorbed on the surface of the pigment particles and are retained through the subsequent operations of finishing to yield particles which break down or wet more readily in the vehicle in which they are finally incorporated.

L. When pigments made in the presence of quaternary ammonium compounds are dried and made into inks, the masstone of the ink is generally lighter, cleaner, and brighter; the undertones are usually cleaner, and the tints are often brighter and stronger. While each of these effects is not always produced, there is a general improvement of some kind in the ink produced from pigments made by this process, such as that the pigments made by this process generally give brighter or stronger colors in rubber, or a specific or marked improvement in some one quality, so that it can be said that the process is a general one for improving azo oil and water insoluble colors.

M. As many apparently widely different embodiments of this invention may be made without departing from the spirit and scope thereof, it is understood that I do not limit myself to the specific embodiments thereof except as defined in the appended claim.

I claim:

The process of forming pigments of the azo class insoluble in oil and water, which comprises coupling a diazotized primary arylamine free from water-solubilizing groups with a coupling component of the aceto-acet arylid class free from water-solubilizing groups in the presence of a quaternary ammonium compound, and washing the pigment acid free.

JOSEPH W. LANG.